US009578579B2

(12) United States Patent
Dalsgaard et al.

(10) Patent No.: US 9,578,579 B2
(45) Date of Patent: Feb. 21, 2017

(54) EFFICIENT MEASUREMENT REPORTING BY A USER EQUIPMENT (UE)

(71) Applicant: Nokia Technologies Oy, Espoo (FI)

(72) Inventors: Lars Dalsgaard, Oulu (FI); Jussi-Pekka Koskinen, Oulu (FI); Jorma Kaikkonen, Oulu (FI); Ilkka Keskitalo, Oulu (FI); Jarkko Tuomo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/650,025

(22) PCT Filed: Dec. 18, 2012

(86) PCT No.: PCT/IB2012/057440
§ 371 (c)(1),
(2) Date: Jun. 5, 2015

(87) PCT Pub. No.: WO2014/096902
PCT Pub. Date: Jun. 26, 2014

(65) Prior Publication Data
US 2015/0319667 A1 Nov. 5, 2015

(51) Int. Cl.
H04W 36/30 (2009.01)
H04W 28/08 (2009.01)
(Continued)

(52) U.S. Cl.
CPC ........... *H04W 36/30* (2013.01); *H04W 16/32* (2013.01); *H04W 24/10* (2013.01); *H04W 28/08* (2013.01);
(Continued)

(58) Field of Classification Search
CPC ...... H04W 36/30; H04W 28/08; H04W 36/14; H04W 16/32; H04W 36/0088; H04W 24/10; H04W 36/04; H04W 84/045; Y02B 60/50
See application file for complete search history.

(56) References Cited

U.S. PATENT DOCUMENTS

2009/0117891 A1 5/2009 Chou
2010/0015984 A1 1/2010 Kazmi
(Continued)

OTHER PUBLICATIONS

International Search Report and Written Opinion received for corresponding Patent Cooperation Treaty Application No. PCT/IB2012/057440, dated Oct. 16, 2013, 20pages.
(Continued)

Primary Examiner — Nam Huynh
(74) Attorney, Agent, or Firm — Mintz Levin Cohn Ferris Glovsky and Popeo, P.C.

(57) ABSTRACT

A method, apparatus and software related product (e.g., a computer readable memory) for efficient measurement reporting by UEs to provide, for example, lower UE power consumption, efficient use of network resources, small cell ottloading, etc., in wireless networks such as LTE/LTE-A systems that can be also applied in inter-system cases such as a mix of UTRAN and E-UTRAN as one non-limiting example is presented. The UE performs measurements and event evaluation as in conventional LTE/LTE-A systems, but for certain cells/carriers an event triggered measurement report, which conventionally would be transmitted when time-to-trigger (TTT) expires (see details e.g. in 3GPP TS 36.331), is not transmitted but regarded as buffered (e.g., in a memory or buffered memory of the UE) as a candidate measurement report, when a predefined criterion is not met. This predefined criterion is e.g. a need at the UE to request network resources for uplink transmission by the UE. Thus, a UE being in connected mode but not actively transmitting data, will not report measurements resulting in likely handovers.

20 Claims, 3 Drawing Sheets

(51) Int. Cl.
*H04W 36/14* (2009.01)
*H04W 16/32* (2009.01)
*H04W 36/00* (2009.01)
*H04W 24/10* (2009.01)

(52) U.S. Cl.
CPC ......... *H04W 36/0088* (2013.01); *H04W 36/14* (2013.01); *Y02B 60/50* (2013.01)

(56) References Cited

U.S. PATENT DOCUMENTS

| | | | |
|---|---|---|---|
| 2010/0190488 A1* | 7/2010 | Jung | H04W 24/10 455/424 |
| 2010/0279682 A1 | 11/2010 | Rangaiah et al. | |
| 2011/0009116 A1 | 1/2011 | Moberg et al. | |
| 2014/0036748 A1* | 2/2014 | Mukherjee | H04W 52/0212 370/311 |

OTHER PUBLICATIONS

Orange et al. "3GPP TSG-RAN WG2 Meeting #68bis; R2-100239; MDT Measurement Model", 3GPP draft; R2-100239, 3rd Generation Partnership Project (3GPP), Mobile Competence Centre; 650, Route Des Lucioles; F-06921 Sophia-Antipolis Cedex; France, vol. RAN WG2, No. Valencia, Spain; Jan. 18, 2010, Jan. 12, 2010.

\* cited by examiner

EFFICIENT MEASUREMENT REPORTING BY A USER EQUIPMENT (UE)

RELATED APPLICATION

This application was originally filed as PCT Application No. PCT/IB2012/057440 filed Dec. 18, 2012.

TECHNICAL FIELD

The exemplary and non-limiting embodiments of this invention relate generally to wireless communications and more specifically to efficient measurement reporting by a user equipment, e.g., in LTE/LTE-A systems.

BACKGROUND ART

This section is intended to provide a background or context to the invention disclosed below. The description herein may include concepts that could be pursued, but are not necessarily ones that have been previously conceived, implemented or described. Therefore, unless otherwise explicitly indicated herein, what is described in tins section is not prior art to the description in this application and is not admitted to be prior art by inclusion in this section.

The following abbreviations that may be found in the specification and/or the drawing figures are defined as follows:
3GPP $3^{rd}$ generation partnership project
DL downlink
eNB, eNodeB evolved node B/base station in an E-UTRAN system
E-UTRAN evolved, universal terrestrial radio access network (LTE)
HetNet heterogeneous network
HO handover
LTE long term evolution
LTE-A long term evolution advanced
MR measurement report
PCI physical cell identity
Pcell primary cell
PPI power preference identification
PUCCH packet uplink control channel
RA random access
RACH random access channel
RAT radio access technology
RSRP reference signal received power
RSRQ reference signal, received, quality
RACH random access channel
Scell secondary cell
SR scheduling request
TP throughput
TTT time-to-trigger
HE user equipment
UL uplink
UTRAN universal terrestrial radio access network Current E-UTRAN specification as well as standard legacy UE assisted network controlled handover based mobility is built around the same structure: the UE in a connected mode is configured with a measurement configuration by the network. This configuration includes the necessary information for giving the UE clear instructions on what to measure on which carriers (and/or RATs) as well as the reporting rules.

Based on this configuration the UE can perform measurements according to at least the minimum performance requirements defined by specifications (e.g., see 3GPP TS 36.133), so that a set of tests are performed to ensure that the UEs fulfill these minimum performance requirements. From a system point of view it is important that the UEs at least fulfill these minimum performance requirements in order to ensure similar and homogeneous behavior among the UEs in the network. This can enable better tuning of the network settings and therefore better use of the available resources, etc.

This approach may work well in the current systems which has so far mostly been based on having good coverage and the mobility to ensure that the UEs are connected at any time in order to ensure best use of network resources as well as best user experience, e.g., in a form of the highest possible user throughput (TP) and lowest loss of service rates.

In the coming 3GPP releases the work, has already started to focus on small cell enhancements, specifically, how to increase the network capacity including user data TP in order to enable handling of the expected sharp increase of wireless data transmission in the future. It is expected that the future user demands for instant high TP as well as optimized UE power consumption will be an important challenge. In addition it is also foreseen that the amount of smart phones will increase significantly and many of these devices are likely to be always online. Being always online would mean that these devices would need continuous connected mode mobility, i.e., mobility by handover, which may increase significantly mobility signaling related load in the network.

SUMMARY

According to a first aspect of the invention, a method, comprising: performing by a user equipment one or more measurements; evaluating by the user equipment one or more events related to the one or more measurements; and if the at least one evaluated event is fulfilled during the time-to-trigger period and a predefined criterion is not met, buffering, after expiring the time-to-trigger period, a triggered measurement report related to the at least one fulfilled evaluated event as a candidate measurement report.

According to a second aspect of the invention, an apparatus comprising: at least one processor and a memory storing a set of computer instructions, in which the processor and the memory storing the computer instructions are configured to cause the apparatus to: perform one or more measurements; evaluate one or more events related to the one or more measurements; and if the at least one evaluated event is fulfilled during the time-to-trigger period and a predefined criterion is not met, buffer, after expiring the time-to-trigger period, a triggered measurement report related to the at least one fulfilled evaluated event as a candidate measurement report.

According to a third aspect of the invention, a computer program product comprising a computer readable medium bearing computer program code embodied herein for use with a computer, the computer program code comprising: code for performing by a user equipment one or more measurements; code for evaluating by the user equipment one or more events related to the one or more measurements; and if the at least one evaluated event is fulfilled during the time-to-trigger period and a predefined criterion is not met, code for buffering, after expiring the time-to-trigger period, a triggered measurement report related to the at least one fulfilled evaluated event as a candidate measurement report.

According to a fourth aspect of the invention, a method, comprising: configuring by a network element a user equipment to start efficient measurement reporting; and receiving by the network element a triggered measurement report send by the user equipment if the predefined criterion is met according to the configured efficient measurement reporting.

According to a fifth aspect of the invention, a apparatus comprising: at least one processor and a memory storing a set of computer instructions, in which the processor and the memory storing the computer instructions are configured to cause the apparatus to: configure by a network element a user equipment to start efficient measurement reporting; and receive by the network element a triggered measurement report send by the user equipment if the predefined criterion is met according to the configured efficient measurement reporting.

According to a sixth aspect of the invention, a computer program product comprising a computer readable medium bearing computer program code embodied, herein for use with a computer, the computer program code comprising: code for configuring by a network element a user equipment to start efficient measurement reporting; and code for receiving by the network element a triggered measurement report send by the user equipment if the predefined criterion is met according to the configured efficient measurement reporting.

BRIEF DESCRIPTION OF THE DRAWINGS

For a better understanding of the nature and objects of the present invention, reference is made to the following detailed description taken in conjunction with the following drawings, in which.

DETAILED DESCRIPTION

Figure 1:
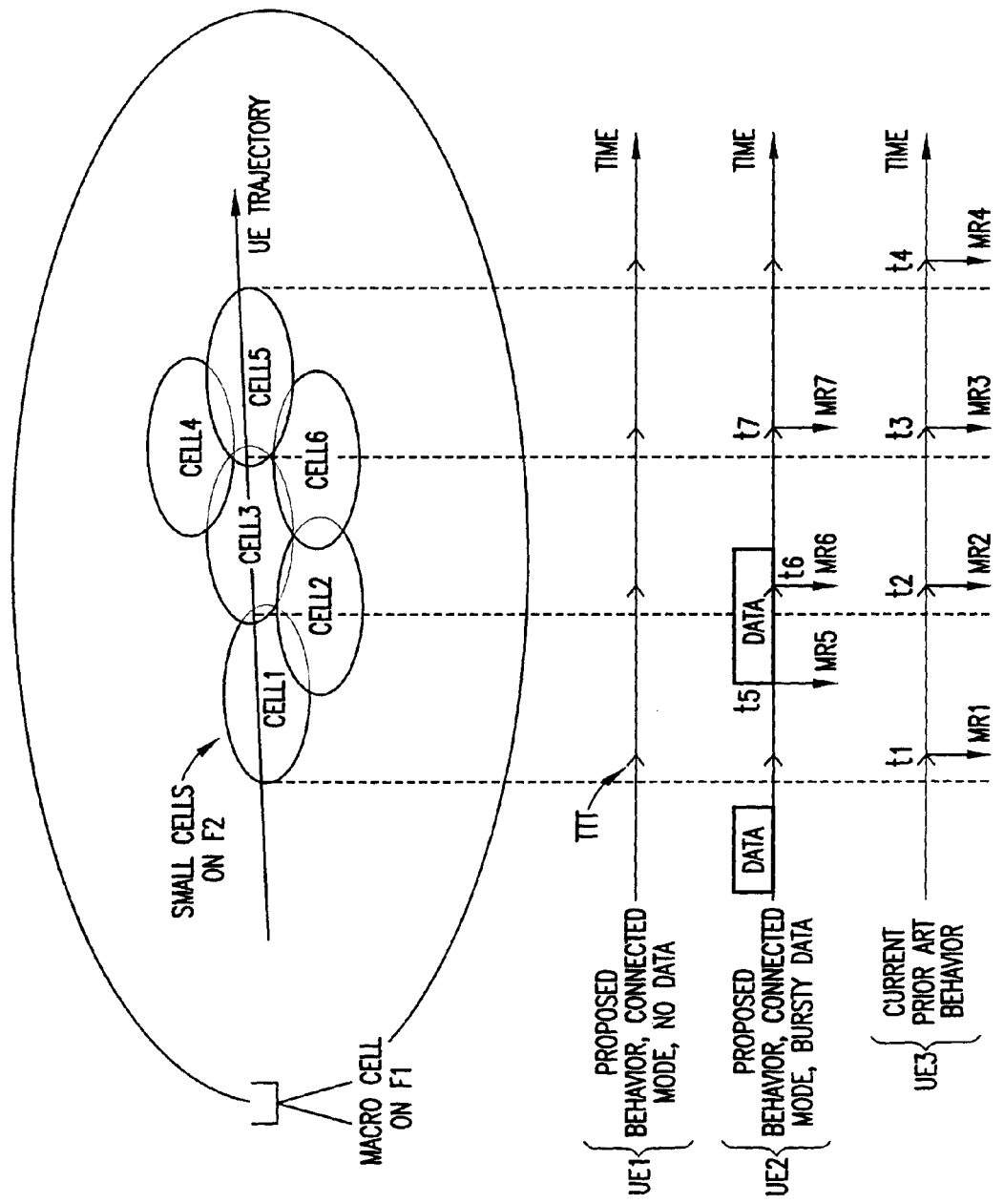
FIG. 1 is a non-limiting example of a time diagram illustrating embodiments of the invention for user equipments UE1 and UE2 while a conventional approach is used for a UE3, e.g., in LIE (E-UTRAN) environment.

To keep up with growing demand in wireless communications new methods are needed to ensure that the mobility can work with improved rules so that mobility related signaling can be optimized to instances when it is really needed.

Current E-UTRAN and legacy systems are using UE assisted network controlled handover mobility for UEs in a connected mode. When a network starts to be deployed with a mix of small capacity cells and macro layer cells (for coverage), e.g., HetNet deployments, it is foreseen that the mobility related procedures such as measurement reporting and handover signaling will increase significantly if current approach is applied without changes. 3GPP standards TS 36.331 and TS 36.133 describe the E-UTRAN rules concerning connected mode measurement configuration, event evaluation, measurement reporting as well as handover procedure.

In the current system the UE will measure, evaluate and send measurement reports to the network in a rather independent manner based on the network configuration, in other words, reporting of small cells to be used, e.g., for offloading purposes would also be reported (if some reporting event has been fulfilled) independently of whether there is data need to be transmitted from UE or not.

A new method, apparatus, and software related product (e.g., a computer readable memory) are presented for efficient measurement reporting by UEs to provide, for example, lower UE power consumption, efficient use of network resources, small cell offloading, etc, in wireless networks such as LTE/LTE-A systems but can be also applied in inter-system cases such as a mix of UTRAN and E-UTRAN as one non-limiting example. The UE may perform measurements and event evaluation as in conventional systems but for certain cells/carriers an event triggered measurement report, which conventionally would be transmitted when time-to-trigger (TTT) expires (see details e.g. in 3GPP TS 36.331), may not be transmitted but regarded as buffered (e.g., in a memory or buffered memory of the UE) as a candidate measurement report possibly to be transmitted if necessary later on.

Thus according to an embodiment of the invention, the UE (e.g., in a macro cell served by eNB) can perform one or more measurements (e.g., measuring small cells). The measurements will be used in event evaluation to evaluate whether an event related to the one or more measurements are or have been fulfilled during a time-to-trigger (TTT) period. Then if all the measurements fulfills the event during the TTT period, the UE may buffer the measurement report triggered by the event as a candidate measurement report to be sent if a predefined criterion (such as a need to transmit UL data) is not met, e.g., after expiring the time-to-trigger period. In other words, the event is evaluated as in prior art but when the TTT expires the measurement report is regarded as a triggered measurement report but not necessarily sent to the network. For example, if there is no need for resources (the predefined criterion is not met) the measurement report can be buffered and continuously re-evaluated, when new measurements are performed in order to re-evaluate whether the event which triggered the report is still valid. As long as the event is still valid, the report is continuously stored/buffered in the UE and may be ready for transmission. In other words, the buffered measurement report means that the measurement report is not sent at the point of TTT expiry but is instead buffered (stored) for potential future transmission as a candidate measurement report. The candidate measurement report is the report that was triggered but not sent (buffered) due to tire predefined criterion not being met as described herein.

Then after expiring the TTT period and after buffering the triggered measurement report, the UE may continue performing the one or more measurements and evaluate the event; and when the UE ascertains that the predefined criterion is met (e.g., there is a need to transmit UL data) and the evaluated event is still fulfilled, the UE may send the candidate measurement report to a serving access node (eNB) of the network to request resource(s) for sending data. However, if the event no longer fulfilled, the buffered and triggered measurement report may be deleted.

Moreover, according to a further embodiment, the predefined criterion may be a need to request one or more resources from a network for uplink transmission, so that if resources from a network are not needed, the triggered measurement report may not be sent but buffered as the candidate measurement report. Generally, the resources may be needed by the UE for UL transmission so that the (triggered) measurement report would be sent to the network at the point when the UE may identify a need to request resources from the network for sending data (e.g., for data offloading). Request of resources from the network could be done, e.g., by using RACH or SR (scheduling request).

As employed herein "data offloading" may be assumed to mean that some data to be transmitted from or received by a UE is actually conveyed through a cell (e.g., a small cell in HetNet) other than a currently serving macro cell of the user equipment. Data offloading may thus be viewed as a technique to, e.g., conserve a bandwidth of the macro cell (e.g., an E-UTRAN macro cell), increase a user experience through the increased data throughput, and lower UE power consumption and efficient use of the network resources.

Furthermore, the triggered event (the event that triggered the candidate measurement report) may be continuously re-evaluated according to arrival of new measurements performed by the UE. If the event is no longer fulfilled (e.g., according to current rules) the triggered candidate measurement report may no longer be regarded as being a candidate measurement report and need no longer being buffered or prepared. A still valid/active candidate measurement report would be transmitted to the network when the UE can see a need to request resources from the network.

As stated herein, the UE would still perform measurements and event evaluation as currently defined in 3GPP standards, but at the point of measurement reporting the UE would not send measurement reports related, e.g., to offloading cells. Deferring the reporting can be general or could conditioned by the UE preference for power saving and when the UE has transmitted Power Preference Indication (PPI) indicating that the configuration is primarily optimized for power saving thus allowing the UE to omit the reporting. Such "offloading" cells could be identified, for example, by being on a certain carrier (or identified, e.g., by physical cell identity, PCI), etc. In other words, if the predefined criterion is not met after expiring the time-to-trigger period, the UE may omit sending the triggered measurement report to a serving access node (e.g., macro eNB) if a power preference indication, indicating that the UE is in a power saving mode has been indicated and does not need resources.

Power saving in general is one aspect which can be improved by applying embodiments described herein. Signaling reduction is another important factor. If there is no need for the UE to request resources, there is most probably no need for performing mobility (handover) to, e.g., small cells or to offloading cells. PPI is one indication that can be used to indicate to the network that the UE prefers power saving profile. This would mean that the UE has or sees no immediate need for resources from the network. Therefore, the UE could be kept on a macro layer and would not need to actively use and/or be handed over to small cells or offloading cells. In other words, the handover would not benefit the UE or network but only generate additional control signaling with no benefit and increased UE power consumption. The method can also be applied in general without PPI indication and for any UE for reducing mobility related signaling related to small cells for those cases when this is not seen as necessary. In this case it is possible to reduce also UE power consumption as signaling activity is decreased.

The events specified in the current standards are likely good enough for the purposes of this invention and could be re-used for implementing embodiments described herein without any need for changes. The event would then indicate to the UE that the method described here would apply, e.g., for a given frequency. Currently we have several events defined in 3GPP TS 36.331 in sections 5.5.4.2 through 5.5.4.8. For example, the event may be one of selected examples:

Event A1: serving becomes better than a threshold,
Event A2: serving becomes worse than a threshold,
Event A3: neighbor becomes offset better than Pcell (serving macro cell),
Event A4: neighbor becomes better than threshold,
Event A5: Pcell becomes worse than threshold1 (first threshold) and neighbor becomes better than threshold2 (second threshold), etc.

For example, in Event A4, the neighbor cell may be on a different frequency which may have a practical use while implementing embodiments described herein. When a given cell (small cell or offloading) is better than the given threshold, it may be seen as good enough for active use by the network. But there is only a need for the network to get the knowledge of this information in case there is a need for resources for the UE.

Summarizing, when an event has been fulfilled and measurement report sending has been triggered, the triggered measurement report is buffered (but no measurement report was send due to above rules), the UE may continuously continue to keep tracking the event and continue to evaluate whether it is fulfilled. While deferring the reporting, if the trigger criterion is no longer valid, the measurement reporting condition is no longer valid and reporting can be considered not valid any more and no report needs to be sent. If data arrives to be transmitted on the UE side, and, the entry condition for the triggered event is still fulfilled, this would mean that the UE would transmit the triggered but pending measurement report (if the event is still fulfilled) to the network. When the network receives the measurement report, this could be used to enable the network, e.g., to offload the UE. Described method could potentially be conditioned by the UE preference for power saving (e.g., PPI is sent).

FIG. 1 shows a non-limiting example of a time diagram illustrating embodiments of the invention for user equipments UE1 and UE2 while a conventional approach is used for a UE3, e.g., in LTE (E-UTRAN) environment. Here the macro cell uses a carrier F1 and small cells use a carrier F2. It should be noted that the method could also be used in multi-system where, e.g., the macro cell could be UTRAN on F1 while small cells could be E-UTRAN cells on F2 as one example, i.e., for inter-RAT applications.

As a baseline it is assumed that the UE is arranged with measurement configuration which instructs the UE to perform inter-frequency measurements on a carrier F2 on which the offloading cells are deployed in addition to intra-frequency measurements on F1. The UE is configured, e.g., with event A4, i.e., "neighbor becomes better than threshold". The UE then performs cell detection and measurements according to a configured gap pattern (configured by the network) and evaluates the configured events accordingly. The UE is configured to use event triggered reporting.

Behavior of the UE3 using a conventional approach can be described as follows:
1) The UE3 can detect cell 1 on a carrier F2. This will be followed by measurements and event evaluation resulting in with expiry of time-to-trigger (TTT) after which the UE will transmit a measurement report (MR1) to the eNB at time t1.
2) The network may hereafter send HO command to the UE3 to ensure the UE3 is served by a small cell 1 in case data transmission is initiated.
3) At later point in time the UE3 can detect cell 3 on F2 followed by a measurement report MR2 at time t2.
4) Network may handover the U3 to cell 3 as a result of the measurement report MR2.
5) The same is repeated when the UE3 detects cell 5 on F2 followed by the measurement report MR3 at time t3.

6) When the UE3 is no longer able to detect cell 5 on F2, the network may configure the UE such that this will trigger another measurement report MR4 at time t4, e.g., either for enabling outbound HO from cell 5 or indicating that cell 5 is no longer detectable.

Moreover, behavior of the UE1 using embodiments described herein can be described as follows:

1) The UE1 can detect and measure cell 1 on F2 followed by event evaluation. The event is fulfilled and the measurement report is triggered but not sent to the network because there is. e.g., no UL data to be transmitted.
2) The UE1 can detect and measure cell 3 on F2 followed by event evaluation. The event is fulfilled and the measurement report is triggered but not sent to the network because there is, e.g., no UL data to be transmitted.
3) The UE1 can detect and measure cell 5 on F2 followed by event evaluation. The event is fulfilled and the measurement report is triggered but not sent to the network because there is, e.g., no UL data to be transmitted.
4) The UE1 can measure cell 5 on F2 and notice it is no longer detectable, the event is evaluated. The event is fulfilled and the measurement report is triggered but not sent to the network (as there is, e.g., no data to be transmitted).

It is noted that the UE1 will perform measurements and event evaluation as in the conventional approach. But no measurement reports are sent for the cells on F2 as there is no data to be offloaded. In each of these events the UE1 would continue evaluating the event after it has been triggered but the measurement report has not been sent. This way the UE1 will always keep track of the events and will buffer triggered but not transmitted reports in order to send them (if still fulfilled) in case data transmission is initiated.

Furthermore, behavior of the UE2 using embodiments described herein can be described as follows:

1) The UE2 can have normal data transmission in the macro cell in an area in which there is no coverage of small cells on F2. At some point after the data transmission has ended, the UE2 detects cell on F2. As no data transmission is ongoing the UE2 does not initiate measurement reporting, i.e., the report is not sent to the network when TTT expires.
2) At some point (time t5) the UE2 initiates data transmission. As the earlier triggered event is still fulfilled (and no measurement report was sent) the report MR5 (pending on the UE side) is sent to the network immediately at t5 when data transmission is triggered on the UE2 side. For example the transmission may be triggered by UL data arriving in a UE2 buffer or the UE2 may send a request for UL resources, e.g., using RA burst transmission or scheduling requests (SR) on a PUCCH.
3) The network receives the measurement report MR5 and may use this to offload the UE2 to an offloading cell on F2, in this case cell 1 on F2.
4) During the data transmission the UE2 can detect and report cell 3 on F2 (report MR6 at t6), e.g., according to existing measurement reporting rules. This may be followed by the network handing over the UE2 to cell 3 on F2.
5) At some point the data transmission ends. This may not call for any mobility related actions and the UE2 would camp on cell 3 on F2. Alternatively the network could handover the UE2 back to the macro layer (F1).
6) If the UEs stays on F2 the UE2 can detect after some time cell 5 which will be reported (MR7 at t7) to be followed by handover either to cell 5 on F2 or to the macro cell (on F1). It is noted that reason for reporting MR7 is that the UE is moving out of coverage of cell 3, so this report (MR7) is according to a legacy behavior.

Analyzing the amount of signaling related to measurement reporting and potential handovers as shown in FIG. 1 we can draw the following conclusions:

1) The conventional approach with UE3 will results in 4 measurement reports. If the reports are followed by handover procedures (in order for the UE3 to be in offloading cell in case data transmission is initiated) this would add up to 4 handover procedures plus related configuration signaling.
2) In case according to the embodiment of the invention illustrated with the UE1, which is obtained when the UE1 does not have any active data transmission and therefore would not benefit from being offloaded, we have no mobility related signaling.
3) The illustration in FIG. 1 also shows gains for the case where the UE2 has data to be transmitted and therefore will benefit from being offloaded. In this case we ma have up to three handover procedures—up to three measurement reports and up to three handovers plus related configurations. None of these would be unnecessary though as it allows the network and the UE to get maximum benefit from offloading cells while potentially reducing the related signaling.

Thus it is seen that in the "worst" case according to the embodiment illustrated for the UE2, the mobility related signaling would not increase but would ensure that the mobility related signaling is reduced to those points in time where there is a need for network to command the cell to be changed due to offloading. In one case (e.g., see example with the UE1) illustrated herein there is a significant reduction in the mobility related signaling.

Thus advantages of the embodiments of the invention described herein may include but are not limited to:

Reduction of unnecessary mobility signaling including less measurement reports (only sent when needed), less handover commands, less handover complete messages, less RACH load, less configuration signaling related to entering new cell;

Less risk for HO related failures;

Handovers are performed only if needed (reducing unnecessary handovers);

Allowing fast offloading when needed (when there is data to be transmitted);

Reduced UE impact from mobility (e.g., lower power consumption).

Reduced signaling overhead.

Figure 2:
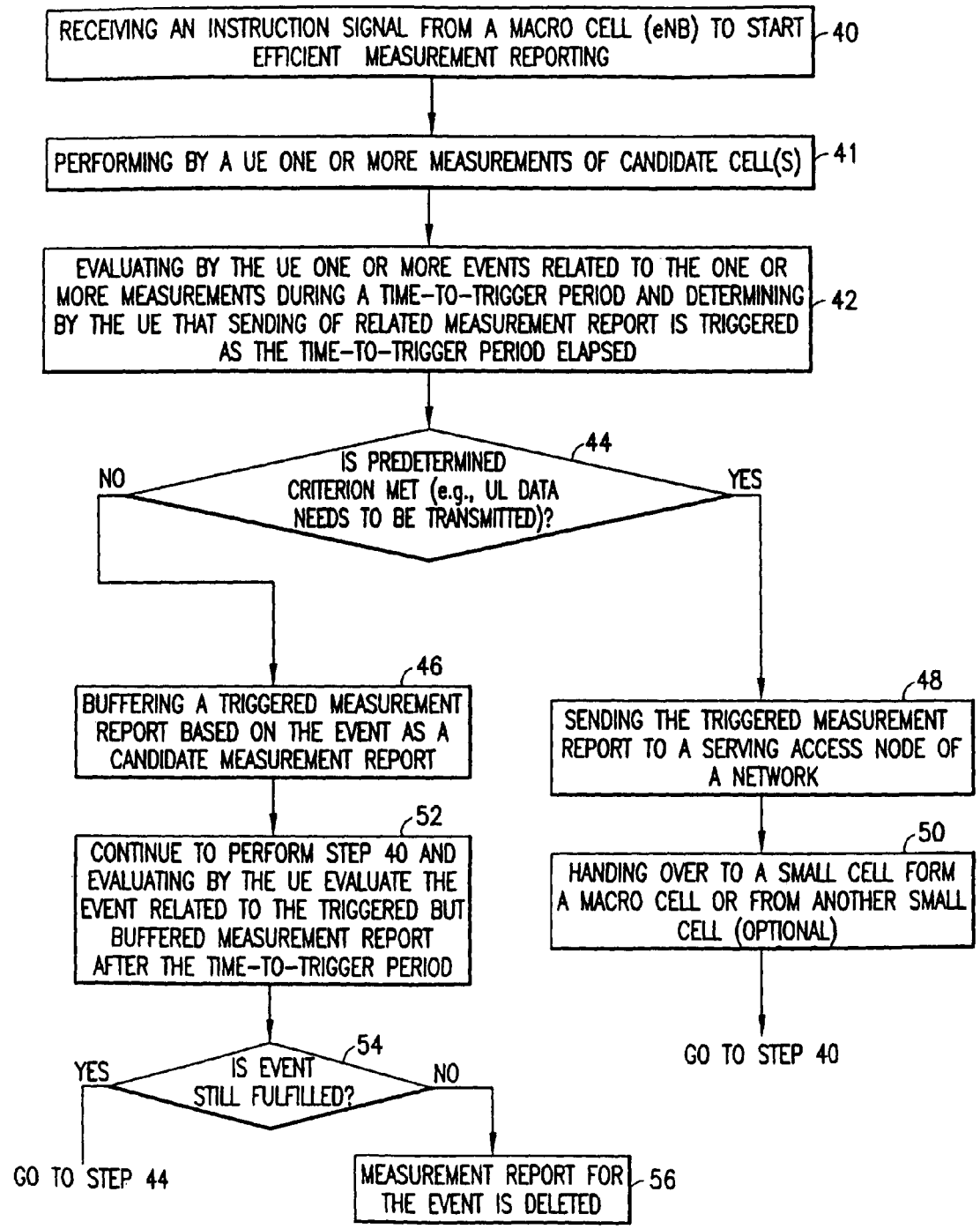
FIG. 2 is a flow chart demonstrating implementation of exemplary embodiments of fee invention by a UE

FIG. 2 shows an exemplary flow chart demonstrating one possible implementation of embodiments of the invention by a UE. It is noted that the order of steps shown in FIG. 2 is not absolutely required, so in principle, the various steps may be performed out of the illustrated order. Also certain steps may be skipped, different steps may be added or substituted, or selected steps or groups of steps may be performed in a separate application.

In a method according to the exemplary embodiment shown in FIG. 2, in a first step 40, the UE receives an instruction signal from a macro cell (a macro eNB) to start efficient measurement reporting. In a next step 41, the UE performs one or more measurements of candidate cell(s). In a next step 42 the UE evaluates one or more events related to the one or more measurements. If an event is fulfilled the UE starts the time-to-trigger for that event. If the event is still fulfilled during the time-to-trigger period and when it elapses the UE determines that sending of related measurement report is triggered.

In a next step 44, it is determined by the UE whether a predetermined criterion is met (e.g., UL data needs to be transmitted). If that is not the case, in a next step 46 the UE buffers (stores) a triggered measurement report based on the event as a candidate measurement report. Then in step 52 the UE continues to evaluate the event related to the triggered and buffered measurement report, first, by performing the measurement like in step 40. While performing new measurements in step 52, the UE will continue to evaluate whether the event related to the triggered and buffered measurement report is still fulfilled. If this is the case the buffered measurement report is still regarded as triggered. If the event is no longer fulfilled as evaluated in step 54, the triggered report is no longer considered as triggered and may be deleted as indicated in step 56. If the event is still fulfilled as determined in step 54, the process goes back to step 44.

Coming back to step 44, if the predetermined criterion is met in step 44 (e.g., the UL data needs to be transmitted by the UE), in a next step 48 the UE sends the triggered measurement report to a serving access node (e.g., macro eNB) of the network. In a next step 50, the network may command UE (the UE receives a corresponding command) to undertake handover to a small cell from a macro cell or from another small cell, as configured/directed by the network, e.g., for offloading (optional step). Step 50 is optional and completely up to the network. Then the process can go back to step 40 (possibly in a new cell after HO based on a new configuration).

Figure 3:
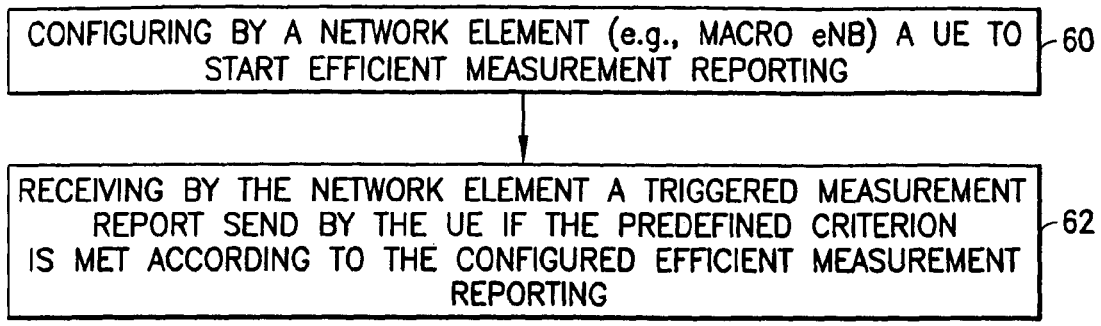
FIG. 3 is a flow chart demonstrating implementation of exemplary embodiments of the invention by a macro eNB.

FIG. 3 shows an exemplary flow chart demonstrating one possible implementation of embodiments of the invention by a network element (e.g., a macro eNB). It is noted that the order of steps shown in FIG. 3 is not absolutely required, so in principle, the various steps may be performed out of the illustrated order. Also certain steps may be skipped, different steps may be added or substituted, or selected steps or groups of steps may be performed in a separate application.

In a method according to the exemplary embodiment shown in FIG. 3, in a first step 60, the macro eNB configures a UE to start efficient measurement reporting. In a next step 62, the macro eNB receives a triggered measurement report send by the UE if the predefined criterion is met according to the configured efficient measurement reporting.

It is further noted that configuring the UE by the eNB in step 60 may include providing by the eNB information to the UE comprising (but may not be limited to):

Indication that for a given event special reporting is applied;

Indication that for a given measObject (carrier/frequency) special reporting is applied;

Indication for certain cells that special reporting is applied.

Figure 4:
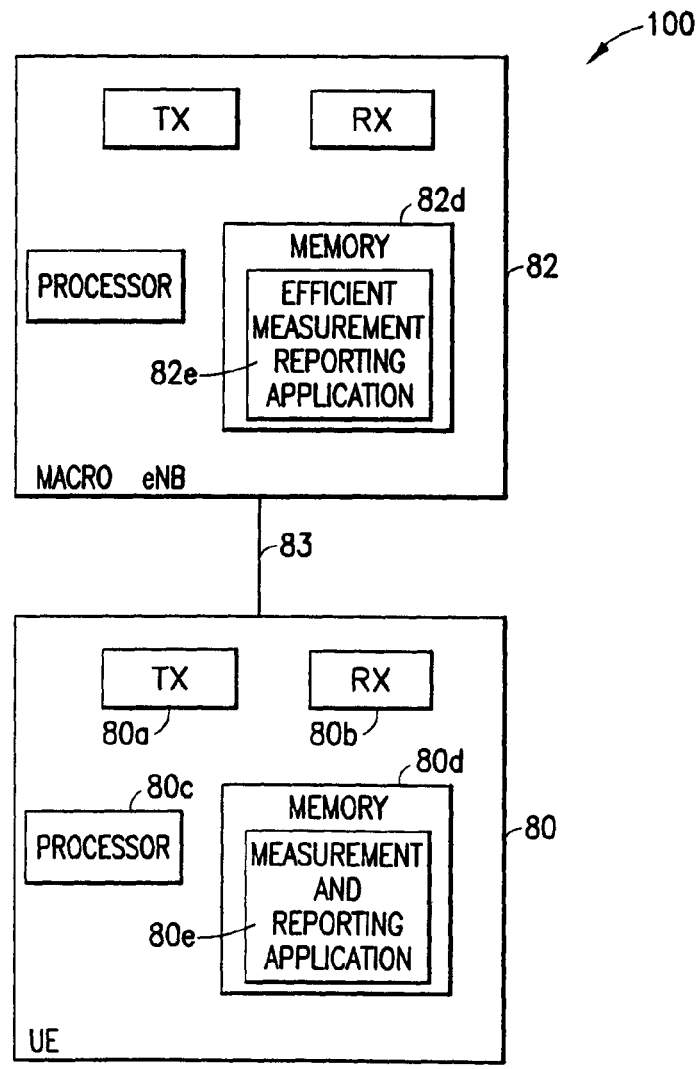
FIG. 4 is a block diagram of a UE for practicing exemplary embodiments of the invention.

This indication could be realized in various ways. FIG. 4 shows an example of a block diagram demonstrating LTE UE device 80 and macro eNB 82 comprised in a network 100, according to an embodiment of the invention. FIG. 34 is a simplified block diagram of an electronic device that is suitable for practicing the exemplary embodiments of this invention, and a specific manner in which components of an electronic device are configured to cause that electronic device to operate. The UE 80 may be a mobile phone, a camera mobile phone, a wireless video phone, a portable device or a wireless computer, and the like.

The device 80 may comprise, e.g., at least one transmitter 80a at least one receiver 80b, at least one processor 80c at least one memory 80d and a measurement and reporting application module 80e. The transmitter 80a and the receiver 80b may be configured to provide a wireless communication with the macro eNB 82 and small cells/eNBs (not shown in FIG. 3), e.g., through a wireless link 83, according to the embodiments of the invention. The transmitter 80a and the receiver 80b may be generally means for transmitting/receiving and may be implemented as a transceiver, or a structural equivalence thereof. It is further noted that the same requirements and considerations are applied to transmitters and receivers of the macro eNB 82.

Various embodiments of the at least one memory 80d (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM. SRAM, EEPROM and the like. Various embodiments of the processor 80c include but are not limited to general purpose computers, special purpose computers, microprocessors, digital signal processors (DSPs) and multi-core processors. Similar embodiments are applicable to memories and processors in other devices of the network 100, e.g., to eNB 82 shown in FIG. 4.

The measurement and reporting application module 80e may provide various instructions for performing steps 40-50 shown in FIG. 2, according to different embodiments described herein. The module 80e may be implemented as an application computer program stored in the memory 80d, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 80e may be implemented as a separate block or may be combined with any other module/block of the device 80, or it may be split into several blocks according to their functionality.

The device 82 may have similar components as the UE 80, as shown in FIG. 4, so that the above discussion about components of the UE 80 is fully applicable to the components of the UE 82.

The efficient measurement reporting application module 82e in the eNB 82 may provide various instructions for performing steps 60-62 shown in FIG. 3. The module 82e may be implemented as an application computer program stored in the memory 82d of the eNB 82, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 82e may be implemented as a separate block or may be combined with any other module/block of the device 82, or it may be split into several blocks according to their functionality.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method, comprising:
performing, by a user equipment, one or more measurements;
evaluating, by the user equipment, one or more event related to the one or more measurements; and
buffering, by the user equipment, a triggered measurement report when the one or more event is fulfilled during a time-to-trigger period and the user equipment does not need to request one or more resources from a network for uplink transmission, wherein the buffering occurs after the time-to-trigger period expires, wherein the triggered measurement report relates to the one or more event, and wherein the triggered measurement report is buffered as a candidate measurement report.

2. The method of claim 1, further comprising:
performing, by the user equipment and after the time-to-trigger period expires, one or more second measurements;
evaluating, by the user equipment and after the time-to-trigger period expires, the one or more event; and
sending, by the user equipment and to a serving access node of the network, the candidate measurement report when the one or more event is fulfilled based on the one or more second measurements and the user equipment needs to request resources from the network for uplink transmission.

3. The method of claim 2, further comprising:
performing handover from a macro cell to a small cell or from one small cell to another small cell.

4. The method of claim 1, wherein the one or more event is one or more of:
a serving cell becomes worse than a first threshold,
a neighboring cell becomes offset better than a primary serving cell,
a neighboring cell becomes better than a second threshold,
a primary serving cell becomes worse than a third threshold, and
a neighboring cell becomes better than a fourth threshold.

5. The method of claim 1, further comprising:
sending, by the user equipment and to a serving access node of the network, an indication that the user equipment prefers configuration optimized for power saving, wherein sending the indication allows the user equipment to buffer the triggered measurement report.

6. The method of claim 1, wherein the measurement report comprises a cell carrier or a physical cell identity for an offloading cell.

7. The method of claim 1, further comprising:
performing, by the user equipment and after the time-to-trigger period expires, one or more second measurements;
evaluating, by the user equipment and after the time-to-trigger period expires, the one or more event; and
deleting, by the user equipment, the candidate measurement report when the one or more event is not fulfilled based on the one or more second event and/or when the user equipment does not need to request resources from the network for uplink transmission.

8. The method of claim 1, wherein the method comprises:
receiving, by the user equipment and prior to performing the one or more measurements, an instruction signal to start measurement reporting from a network element.

9. An apparatus comprising:
at least one processor and a memory storing a set of computer instructions, in which the processor and the memory storing the computer instructions are configured to cause the apparatus to at least:
perform one or more measurements;
evaluate one or more event related to the one or more measurements; and
buffer a triggered measurement report when the one or more event is fulfilled during the time-to-trigger period and the apparatus does not need to request one or more resources from a network for uplink transmission, wherein the buffering occurs after the time-to-trigger period expires, wherein the a triggered measurement report relates to the one or more event, and wherein the triggered measurement report is buffered as a candidate measurement report.

10. The apparatus of claim 9, wherein the processor and the memory storing the computer instructions are further configured to cause the apparatus to at least:
perform, after the time-to-trigger period expires, one or more second measurements,
evaluate, after the time-to-trigger period expires, the one or more event; and
send, to a serving access node of the network, the candidate measurement report when the one or more event is fulfilled based on the one or more second measurements and the apparatus needs to request resources from the network for uplink transmission.

11. The apparatus of claim 10, wherein the processor and the memory storing the computer instructions are further configured to cause the apparatus to at least:
perform handover from a macro cell to a small cell or from one small cell to another small cell.

12. The apparatus of claim 9, wherein the one or more event is one or more of:
a serving cell becomes worse than a first threshold,
a neighboring cell becomes offset better than a primary serving cell,
a neighboring cell becomes better than a second threshold,
a primary serving cell becomes worse than a third threshold, and
a neighboring cell becomes better than a fourth threshold.

13. The apparatus of claim 9, wherein the processor and the memory storing the computer instructions are further configured to cause the apparatus to at least:
send, to a serving access node of the network, an indication that the apparatus prefers configuration optimized for power saving, wherein sending the indication allows the apparatus to buffer the triggered measurement report.

14. The apparatus of claim 9, wherein the measurement report comprises a cell carrier or a physical cell identity for an offloading cell.

15. The apparatus of claim 9, wherein the one or more measurements are at least one of:
inter-frequency measurements,
intra-frequency measurements, and
inter radio access technology measurements.

16. The apparatus of claim 9, wherein the processor and the memory storing the computer instructions are further configured to cause the apparatus to at least:
- perform, after the time-to-trigger period expires, one or more second measurements; and
- evaluate, after the time-to-trigger period expires, the one or more event; and
- delete the candidate measurement report when the one or more event is not fulfilled based on the one or more second event and/or when the user equipment does not need to request resources from the network for uplink transmission.

17. A non-transitory computer-readable storage medium including computer program code, which when executed by at least one processor causes operations comprising:
- performing, by a user equipment, one or more measurements;
- evaluating, by the user equipment, one or more event related to the one or more measurements; and
- buffering, by the user equipment, a triggered measurement report when the one or more event is fulfilled during a time-to-trigger period and the user equipment does not need to request one or more resources from a network for uplink transmission, wherein the buffering occurs after the time-to-trigger period expires, wherein the triggered measurement report relates to the one or more event, and wherein the triggered measurement report is buffered as a candidate measurement report.

18. The non-transitory computer-readable storage medium of claim 17, wherein the operations further comprise:
- performing, by the user equipment and after the time-to-trigger period expires, one or more second measurements;
- evaluating, by the user equipment and after the time-to-trigger period expires, the one or more event; and
- sending, by the user equipment and to a serving access node of the network, the candidate measurement report when the one or more event is fulfilled based on the one or more second measurements and the user equipment needs to request resources from the network for uplink transmission.

19. The non-transitory computer-readable storage medium of claim 17, wherein the operations further comprise:
- performing, by the user equipment and after the time-to-trigger period expires, one or more second measurements;
- evaluating, by the user equipment and after the time-to-trigger period expires, the one or more event; and
- deleting, by the user equipment, the candidate measurement report when the one or more event is not fulfilled based on the one or more second event and/or the user equipment does not need to request resources from the network for uplink transmission.

20. The non-transitory computer-readable storage medium of claim 17, wherein the operations further comprise:
- receiving, by the user equipment and prior to performing the one or more measurements, an instruction signal to start measurement reporting from a network element.

* * * * *